(12) United States Patent
Siddiqui et al.

(10) Patent No.: US 10,112,612 B2
(45) Date of Patent: Oct. 30, 2018

(54) COORDINATED ACTUATION OF VEHICLE STOP MODES

(71) Applicant: Ford Global Technologies, LLC, Dearborn, MI (US)

(72) Inventors: Siraj Siddiqui, Lasalle (CA); Hafiz Shafeek Khafagy, Deaborn, MI (US); Ahmed Awadi, Farmington Hills, MI (US); Hussam Makkiya, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 121 days.

(21) Appl. No.: 15/434,731

(22) Filed: Feb. 16, 2017

(65) Prior Publication Data
US 2018/0229731 A1   Aug. 16, 2018

(51) Int. Cl.
| | |
|---|---|
| *B60W 10/02* | (2006.01) |
| *B60W 30/18* | (2012.01) |
| *B60W 10/06* | (2006.01) |
| *B60W 10/10* | (2012.01) |
| *B60W 20/40* | (2016.01) |
| *F02N 11/08* | (2006.01) |

(52) U.S. Cl.
CPC ...... *B60W 30/18018* (2013.01); *B60W 10/02* (2013.01); *B60W 10/06* (2013.01); *B60W 10/10* (2013.01); *B60W 20/40* (2013.01); *F02N 11/0811* (2013.01); *F02N 11/0866* (2013.01); *B60W 2520/10* (2013.01); *B60W 2710/025* (2013.01); *B60Y 2200/92* (2013.01); *F02N 2011/0888* (2013.01); *F02N 2200/0801* (2013.01); *Y10S 903/93* (2013.01)

(58) Field of Classification Search
None
See application file for complete search history.

(56) References Cited

U.S. PATENT DOCUMENTS

| | | | |
|---|---|---|---|
| 6,171,211 | B1 | 1/2001 | Ortmann et al. |
| 6,634,984 | B1 | 10/2003 | Doering et al. |
| 6,926,639 | B2 | 8/2005 | Hopper |
| 8,565,990 | B2 | 10/2013 | Ortmann et al. |
| 8,788,178 | B2 | 7/2014 | Pebley et al. |
| 8,874,292 | B2 | 10/2014 | Yamazaki et al. |

(Continued)

FOREIGN PATENT DOCUMENTS

EP   2301818 B1   3/2014

*Primary Examiner* — Dirk Wright
(74) *Attorney, Agent, or Firm* — Brooks Kushman P.C.

(57) ABSTRACT

A vehicle includes an engine operable in an auto stop-start (SS) mode. The engine is adapted to auto stop and auto start in the SS mode. The vehicle further includes a transmission operable in an idle load reduction (ILR) mode. In the ILR mode, engagement of a forward clutch is disposed in an alternate first gear state. A controller is operably connected to the engine and the transmission. The controller is programmed to command the engine to operate in the SS mode when a speed of the vehicle is below a predetermined threshold unless one or more SS inhibit conditions are present. The controller is further programmed to, when one or more SS inhibit conditions are present, inhibit operation of the engine in the SS mode and to command the transmission to operate in the ILR mode unless one or more ILR inhibit conditions are present.

20 Claims, 3 Drawing Sheets

(56) References Cited

U.S. PATENT DOCUMENTS

| | | | |
|---|---|---|---|
| 9,731,698 B1* | 8/2017 | Khafagy | F02N 11/08 |
| 10,024,291 B1* | 7/2018 | Khafagy | F02N 11/0837 |
| 2010/0191446 A1 | 7/2010 | McDonald et al. | |
| 2011/0077830 A1 | 3/2011 | Lochocki, Jr. et al. | |
| 2013/0158838 A1 | 6/2013 | Yorke et al. | |
| 2017/0203752 A1* | 7/2017 | Khafagy | B60W 20/13 |
| 2017/0356415 A1* | 12/2017 | Khafagy | F02N 11/0818 |
| 2018/0003143 A1* | 1/2018 | Khafagy | B60L 1/00 |
| 2018/0023493 A1* | 1/2018 | Khafagy | F02N 11/0825 477/98 |
| 2018/0043878 A1* | 2/2018 | Khafagy | B60W 20/15 |

* cited by examiner

COORDINATED ACTUATION OF VEHICLE STOP MODES

TECHNICAL FIELD

This disclosure relates to a stop mode operation of a vehicle, and more particularly to control of a vehicle having an engine operable in an auto stop-start mode and a transmission operable in an idle load reduction mode.

BACKGROUND

There are many instances when a vehicle stops before its destination is reached during a typical driving event. This may occur, for example, when the vehicle stops at traffic signals, cross-walks, stop signs, and the like. An auto-stop/start vehicle may enable a stop/start strategy for starting and stopping the vehicle engine during a drive cycle. The engine is shut down if no power is required (e.g., while waiting at a traffic light). As soon as power is requested, the engine is automatically restarted. The engine may also be automatically started in response to other conditions such as a decrease in battery state of charge or a gear lever being shifted from one gear to another. By avoiding unnecessary engine idling, the vehicle's fuel economy will be improved. For this reason, it is desirable to use the engine shutdown function as much as possible when engine auto-stop conditions are satisfied.

SUMMARY

A vehicle includes an engine operable in an auto stop-start (SS) mode. The engine is adapted to auto stop and auto start in the SS mode. The vehicle further includes a transmission operable in an idle load reduction (ILR) mode. In the ILR mode, engagement of a forward clutch is disposed in an alternate first gear state. A controller is operably connected to the engine and the transmission. The controller is programmed to command the engine to operate in the SS mode when a speed of the vehicle is below a predetermined threshold unless one or more SS inhibit conditions are present. The controller is further programmed to, when one or more SS inhibit conditions are present, inhibit operation of the engine in the SS mode and to command the transmission to operate in the ILR mode unless one or more ILR inhibit conditions are present.

A vehicle stop mode system includes a controller programmed to operate an engine in an auto stop-start (SS) mode when a vehicle speed is below a predetermined threshold unless one or more SS inhibit conditions are present. The controller is further configured to, when one or more SS inhibit conditions are present, inhibit the SS mode and operate a transmission in an idle load reduction (ILR) mode unless one or more ILR inhibit conditions are present.

A method for operating a vehicle when a speed of the vehicle is below a predetermined threshold includes operating a vehicle engine in an auto stop-start (SS) mode unless one or more SS inhibit conditions are present. The method further includes inhibiting, when one or more SS inhibit conditions are present, the SS mode and operating a vehicle transmission in an idle load reduction (ILR) mode unless one or more ILR inhibit conditions are present.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
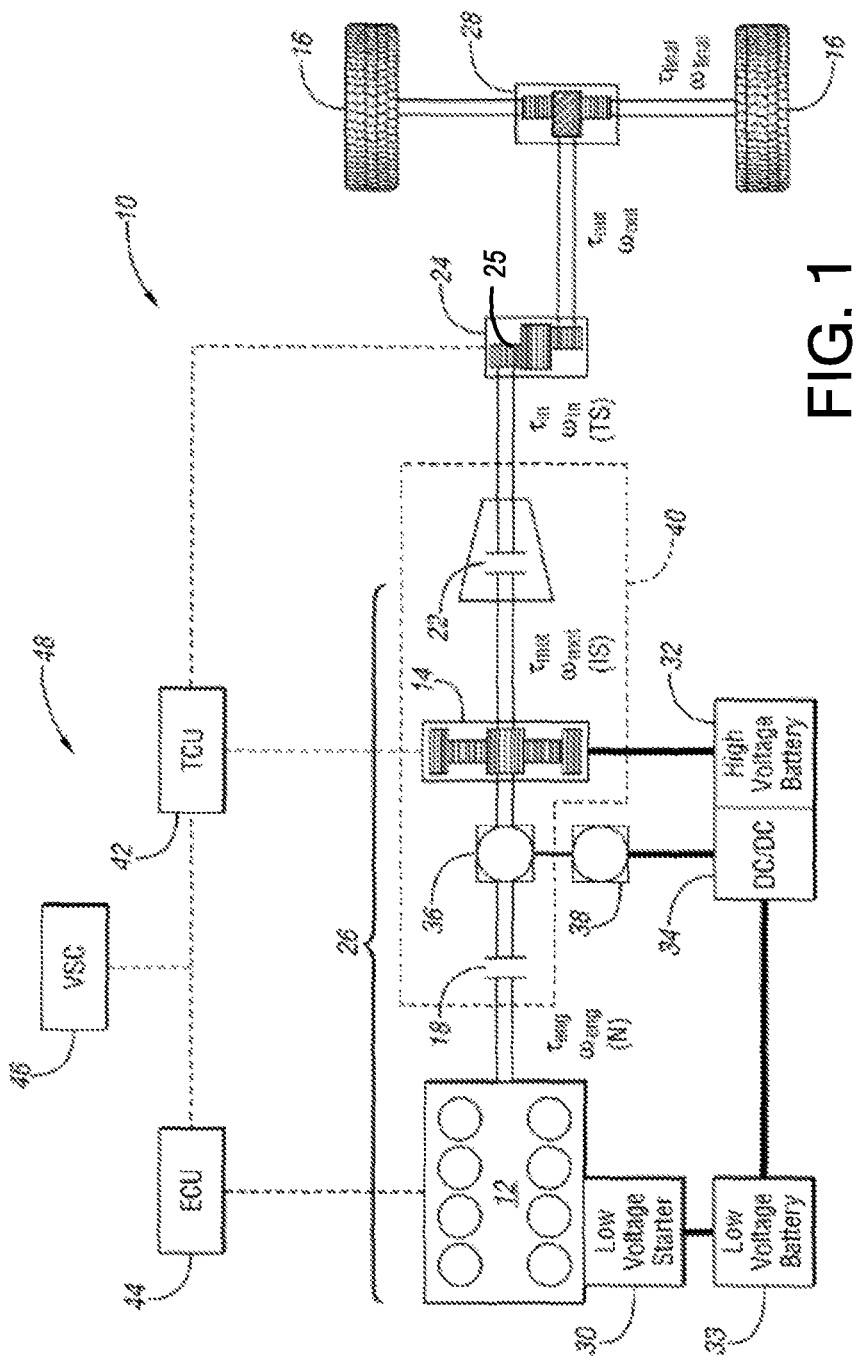
FIG. 1 is a schematic diagram of a vehicle.

Referring now to FIG. 1, a vehicle 10 includes an engine 12 and vehicle wheels 16. In one approach, the engine 12 is a direct injection engine. In other approaches, the engine 12 may be another type of engine or prime mover, such as a port injection engine or fuel cell, or use various fuel sources, such as diesel, biofuel, natural gas, hydrogen, or the like.

In one approach, the engine 12 is the source of propulsion. In another approach, as shown in FIG. 1, the vehicle 10 is a hybrid vehicle that also includes an electric machine 14 for providing vehicle propulsion. The electric machine 14 may be, for example, a motor generator (M/G) or a traction motor. The electric machine 14 is configured to transfer torque to the engine 12 or to the vehicle wheels 16.

The electric machine 14 is connected to the engine 12 using a first clutch 18, also known as a disconnect clutch or the upstream clutch. The clutch 18 may also include a damper mechanism such as a series of plates and springs configured to help dampen changes in torque transferred between the engine 12 and the electric machine 14 when the disconnect clutch 18 is being engaged.

A second clutch 22 connects the electric machine 14 to a transmission 24, such that the input torque to the transmission 24 flows through the launch clutch 22. The second clutch 22 is preferably a torque converter with a bypass clutch. The input from the electric machine 14 is the impeller side of the torque converter, and the output from the torque converter to the transmission 24 is the turbine side. The torque converter 22 transfers torque using its fluid coupling, and torque multiplication may occur depending on the amount of slip between the impeller and turbine sides. The bypass or lock-up clutch for the torque converter may be selectively engaged to create a mechanical connection between the impeller side and the turbine side for direct torque transfer. The bypass clutch may be slipped and/or opened to control the amount of torque transferred through the downstream clutch device 22. The torque converter may also include a one-way clutch.

In another approach, the second clutch 22 is a launch clutch or a downstream clutch that connects the electric machine 14 to a transmission 24, such that the input torque to the transmission 24 flows through the launch clutch 22. The launch clutch 22 may be controlled to isolate the driveline 26, which includes the electric machine 14 and the engine 12, from the transmission 24, differential 28, and the vehicle drive wheels 16.

The clutch 18 and torque converter 22 may be hydraulic clutches or torque converters; however, other types of devices such as electromechanical clutches or torque converters may also be used. In the case of hydraulic clutches, the pressure on the clutch plates is related to torque capacity. In the same way, the forces acting on the plates in a non-hydraulic clutch are also related to torque capacity. Therefore, for consistency in nomenclature, unless otherwise specifically defined, the operation of the clutch 18 and torque converter 22 described herein are in terms of "pressure," though it is understood that it also includes situations where a non-hydraulic force is applied to the clutch plates in a non-hydraulic clutch.

The engine 12 output shaft is connected to the disconnect clutch 18, which in turn is connected to the input shaft for the input shaft to the electric machine 14. The electric machine 14 output shaft is connected to the torque converter 22, which in turn is connected to the transmission 24. The components of driveline 26 of the vehicle 10 are positioned sequentially in series with one another.

In some approaches, the engine 12 is started using the electric machine 14 to rotate the engine 12 using torque provided through clutch 18. Alternatively, the vehicle 10 includes a starter motor 30 operatively connected to the engine 12, for example, through a belt or gear drive. The starter motor 30 may be used to provide torque to start the engine 12 without the addition of torque from the electric machine 14. This isolates the electric machine 14 during engine 12 start and may eliminate or reduce torque disturbances that would otherwise occur when torque was transferred from the electric machine 14 to the engine 12 to assist the engine start.

The electric machine 14 is in communication with a battery 32. The battery 32 may be a high voltage battery. The electric machine 14 may be configured to charge the battery 32 in a regeneration mode, for example when vehicle power output exceeds driver demand, through regenerative braking, or the like. In one example, the battery 32 is configured to connect to an external electric grid, such as for a plug-in electric hybrid vehicle (PHEV) with the capability to recharge the battery from an electric power grid, which supplies energy to an electrical outlet at a charging station. A low voltage battery 33 may also be present to provide power to the starter motor 30 or other vehicle components, and may be connected to battery 32 by a DC to DC converter 34.

In some approaches, the transmission 24 is an automatic transmission and is connected to the drive wheels 16 in a conventional manner, for example, through a differential 28. The vehicle 10 may also be provided with a pair of non-driven wheels; however, in alternative approaches, a transfer case and a second differential may be utilized in order to positively drive all of the vehicle wheels.

The transmission 24 has a gear box to provide various gearing ratios for the vehicle 10. The transmission 24 gearbox may include clutches and planetary gearsets, or other arrangements of clutches and gear trains. Pressurized fluid for the transmission may be provided by a main transmission pump 36. The main transmission pump 36 may be connected to or adjacent to the electric machine 14 such that it rotates with the electric machine 14 and the driveshaft to pressurize and provide transmission fluid. When the portion of the driveline 26 containing the main transmission pump 36 is at rest, the pump 36 is also at rest and is inactive.

To provide pressurized transmission fluid when the main pump 36 is inactive, an auxiliary pump 38 may also be provided. The auxiliary pump 38 may be electrically powered, for example by battery 32. In some embodiments, the auxiliary pump 38 provides a portion of the transmission fluid for the transmission 24 such that the transmission 24 is limited in operation, for example to certain actuators or gearing ratios, when the auxiliary pump 38 is operating.

The electric machine 14, the clutches 18, 22, and a main transmission pump 36 may be located within a motor generator case 40, which may be incorporated into the transmission 24 case, or alternatively, is a separate case within the vehicle 10.

A control system 48 for the vehicle may include a transmission control unit (TCU) 42, an engine control unit (ECU) 44, and a vehicle system controller (VSC) 46. The control system 48 may include any number of controllers, and may be integrated into a single controller, or have various modules. Some or all of the controllers may be connected by a controller area network (CAN) or other system. The control system 48 may be configured to control operation of the various components of the transmission 24, the motor generator assembly 14, the starter motor 30 and the engine 12 under any of a number of different conditions, including determining a start sequence for the engine 12 and implementing the start sequence.

The vehicle controllers, including the TCU 42, ECU 44, and VSC 46 may be electronic controllers. The controllers may generally include any number of microprocessors, ASICs, ICs, memory (e.g., FLASH, ROM, RAM, EPROM and/or EEPROM) and software code to co-act with one another to perform a series of operations. The controllers also include predetermined data, or "look up tables" that are based on calculations and test data and stored within the memory. The vehicle controllers communicate with each other and other vehicle systems over one or more wired or wireless vehicle connections using common bus protocols (e.g., CAN and LIN).

The TCU 42 preferably controls the transmission 24 to operate on a shift schedule, such as a production shift schedule, that connects and disconnects elements within the gear box to control the ratio between the transmission output and transmission input. The TCU 42 may change the shift schedule or transmission 24 operation when the main pump 36 or the auxiliary pump 38 is operational. The TCU 42 also acts to control the electric machine 14, the clutches 18, 22, and other components within the motor generator case 40.

The ECU 44 is configured to control the operation of the engine 12. The VSC 46 transfers data between the TCU 42 and ECU 44 and is also in communication with various vehicle sensors and driver inputs. Under normal powertrain conditions, the VSC 46 interprets the driver's demands (e.g. PRND and acceleration or deceleration demand), and then determines the wheel torque command based on the driver demand and powertrain limits. In addition, the VSC 46 may determine when and how much torque each power source needs to provide in order to meet the driver's torque demand and to achieve the operating point (torque and speed) of the engine.

A controller (e.g., VSC 46) may be in communication with one or more sensors providing information that corresponds to current brake characteristics. For example, a brake pedal position switch may provide a brake pedal state signal that corresponds to a brake pedal position (e.g., applied or released). A position sensor may measure a pedal position and communicate an indication of the brake pedal position to the VSC 46. One or more sensors may also provide output indicative of a braking effort or brake torque that may be measured or derived. The sensors may also include pressure sensors for providing a brake pressure signal that corresponds to an actual brake pressure value within the brake system (e.g., brake line pressure or master cylinder pressure). Other sensors for sensing and conveying vehicle or environmental parameters are expressly contemplated herein.

The VSC 46 communicates with the ECU 44 to control the shutdown and restart of the engine 12 based on input signals that correspond to brake apply and release conditions. The vehicle system 48 anticipates a vehicle launch event based on brake release conditions. By shutting down the engine 12, a stop-start may have improved fuel economy as compared to a conventional vehicle.

A controller, e.g., VSC 46, may be in communication with at least one battery, e.g., battery 32. The controller 46 may receive an indication of a state of charge (SOC) of the battery 32. The indication of the battery SOC may be expressed as a percentage, or any other suitable indication of the battery SOC. The indication of the battery SOC may be determined at the controller 46 or received at an input (not shown) of the controller 46.

The controller 46 can operate the vehicle in a stop-start ("SS") mode. In the start-stop mode, the controller 46 can issue auto-stop commands (e.g., commands to stop the engine 12 during a drive cycle) and auto-start commands (e.g., commands to start the engine 12 during a drive cycle). As the vehicle 10 comes to a stop, for example, the controller 46 may issue a command to begin the process to stop the engine 12. For example, in automatic transmission applications, the controller 46 may issue a command to begin the process to start the engine 12 as a brake pedal (not shown) is disengaged and/or an accelerator pedal (not shown) is engaged after an engine auto-stop. In manual transmission applications, the controller 46 may issue a command to begin the process to start the engine 12 as a clutch pedal (not shown) is disengaged. The engine 12 will be shut down in response to auto-stop commands and will be started in response to auto-start commands.

Figure 2:
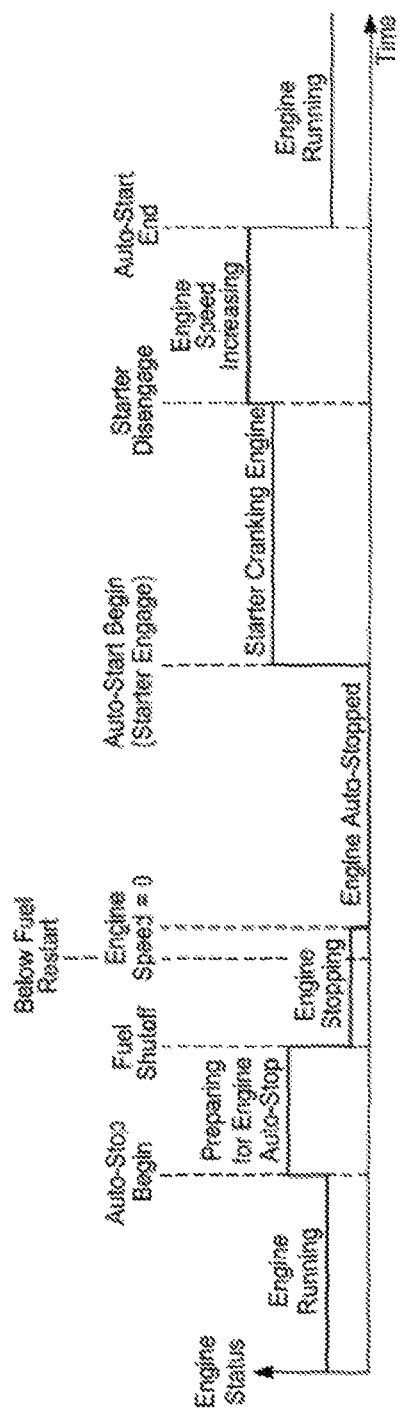
FIG. 2 is a plot of engine status versus time before, during, and after an engine stop/start event.

Referring to FIG. 2, an engine auto-stop event may include several stages. "Auto-stop begin" marks the beginning of the engine auto-stop event. "Preparing for engine auto-stop" is the time period during which vehicle systems as well as the engine are prepared for the impending engine stop. If an auto-stop inhibit condition is detected during this stage, the preparation for the impending engine stop is discontinued and the vehicle systems and engine are returned to their normal operating modes. "Fuel shutoff" marks the point at which fuel flow to the engine is stopped. "Engine stopping" is the time period during which the engine speed decreases to 0. "Below fuel restart" marks the point after which if a restart is requested during the "engine stopping" stage, the starter may need to be engaged to crank the engine. If a restart is requested before "below fuel restart" and during the "engine stopping" stage, the engine may be restarted by turning the flow of fuel back on. "Engine speed=0" marks the point at which the engine speed is near or equal to 0.

"Engine auto-stopped" is the time period during which the engine is off. "Starter engage" marks the point at which the starter starts to crank the engine in an effort to start the engine in response to detecting an engine auto-start condition. "Starter cranking engine" is the time period during which the engine is unable to crank under its own power. "Starter disengage" marks the point at which the engine is able to crank under its own power. "Engine speed increasing" is the time period during which the speed of the engine increases to its running speed (a speed at or above target idle speed). "Auto-start end" marks the point at which the speed of the engine achieves its running speed.

The controller 46 can also issue idle load reduction ("ILR") commands to operate the vehicle 10 in an ILR mode. Similar to the start-stop mode, ILR operation of the vehicle 10 may be initiated when the vehicle 10 is brought to a stand-still or near stand-still position with the engine 12 still running; for example, when the vehicle 10 is stopped at a traffic light. In the ILR mode, engagement of a clutch (e.g., forward clutch 25) is selectively controlled between a first gear state and an alternate first gear state.

In one approach, in the ILR mode, the transmission 24 operates in a neutral idle mode. During neutral idle operation, the transmission 24 may be disengaged, for example, by disengaging a forward clutch 25 of the transmission to put the transmission into a neutral state with little or no torque carrying capacity. Disengagement of the transmission 24 may improve fuel efficiency by unloading the engine, thereby decreasing overall vehicle fuel consumption.

In one example, neutral idle operation of the vehicle 10 may be generally characterized by (i) the vehicle 10 being at rest, (ii) the service brakes applied, (iii) the gear select lever in a forward range, and (iv) all combinations of torque transmitting clutches that establish a speed ratio from the input to the output member of the transmission 24 being disengaged. As a result, during neutral idle operation, the input shaft of the transmission 24 rotates freely at a substantially synchronous speed with the output shaft of the engine 12.

In another approach, in the ILR mode, the transmission 24 operates in a transmission idle load reduction (TILR) mode. In the TILR mode, slip across a forward clutch 25 of the transmission 24 may be controlled, for example, just above stroke pressure. In the TILR mode, the forward clutch dissipates continuous slip power (e.g., up to approximately 1.5 kW). In this way, the speed ratio of the torque converter 22 may be increased from zero (stall) to a desired speed ratio. As the speed ratio increases, the torque multiplication drops, and the relationship between engine speed and impeller torque, otherwise known as the K-factor, increases.

As described, the vehicle 10 may be provided with multiple systems for improving fuel efficiency; for example, a SS system and an ILR system. A controller such as VSC 46 may be used to implement a strategy defining the interaction between the start-stop and ILR systems.

Figure 3:
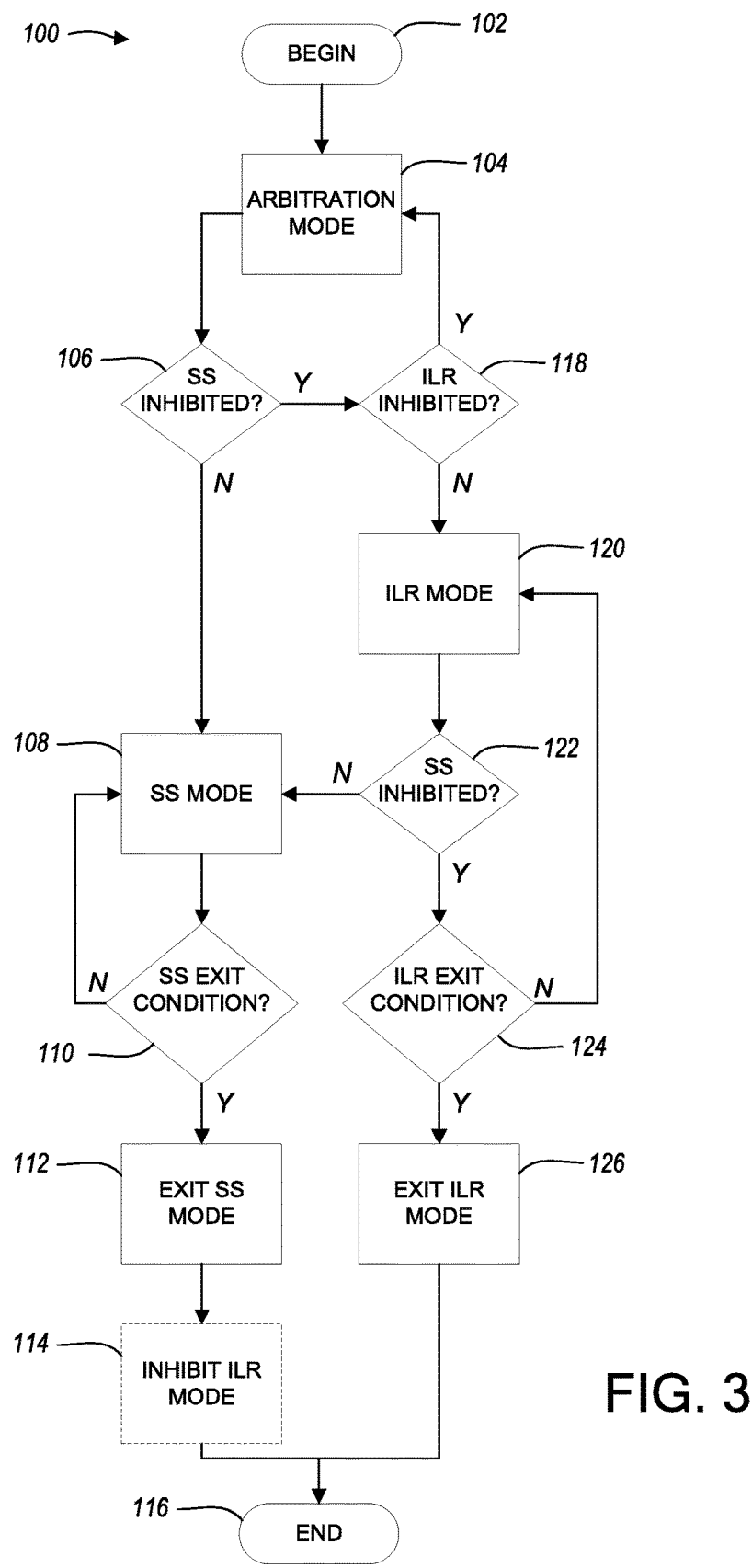
FIG. 3 is a flow chart illustrating a stop mode routine for a vehicle.

Referring now to FIG. 3, a method 100 for controlling a vehicle having SS and ILR capabilities may begin at 102, for example, as the vehicle comes to a stop as a result of a driver pressing on the brake pedal. At block 104, a controller (e.g., VSC 46) performs a stop mode arbitration routine.

In the stop mode arbitration routine, the controller determines 106 whether an auto-stop inhibit condition is detected. For example, the controller may determine if a battery parameter (e.g., voltage or state of charge (SOC)) is less than some predetermined threshold value. As another example, the controller may determine if an engine temperature or engine coolant temperature is outside of a calibratable range. Similarly, the controller may determine whether the electric current demand associated with an electrical load system or electrical load subsystems is greater than some predetermined threshold value. Other auto-stop inhibit conditions may be present, for example, when a vehicle is on a grade having a grade value outside of an allowable range, when an ambient temperature is outside of a calibratable range, when transmission fluid temperature is outside of an allowable range, when a battery temperature is outside of an allowable range, when vehicle climate control is active, when a steering wheel turning angle exceeds an allowable threshold, when a brake pedal pressure is below an allowable threshold, or when a user has deactivated the SS system. Other SS inhibit conditions are expressly contemplated. If one or more auto-stop inhibit conditions are present, the controller may inhibit the SS mode.

When SS mode is not inhibited, the controller operates the vehicle in SS mode at block 108. For example, as the vehicle 10 comes to a stop, for example, the controller may issue a command to begin the process to stop the engine 12.

While operating the vehicle in the SS mode, the controller may inhibit operation of a ILR system. In this way, the start-stop operation is prioritized over the ILR system as the primary stop mode when the vehicle comes to a stop.

Also while operating the vehicle in the SS mode, the controller monitors 110 for a SS mode exit condition. A SS mode exit condition may be, for example, detection of the user releasing the brake pedal from the depressed position, or detection of the user actuating the accelerator. A SS mode exit condition may also be the detection of one or more SS inhibit conditions. For example, if the battery SOC drops below a threshold SOC, the controller may detect a SS mode exit condition.

When a SS mode exit condition is not detected at determination 110, the controller continues to operate the vehicle in SS mode at block 108. However, when the controller detects a SS mode exit condition, the controller initiates 112 a SS mode exit routine. The SS mode exit routine may include restarting the engine.

In one approach, upon initiating the SS mode exit routine, the controller initiates 114 an ILR inhibit timer to inhibit activation of the ILR mode for a calibratable ILR inhibit time. In one approach, the ILR inhibit timer may inhibit operation of the transmission in the ILR mode for a period of approximately 1.5 seconds. In another approach, the ILR inhibit timer may inhibit operation of the transmission in the ILR mode for a period of approximately 5 seconds. Other ILR inhibit times are expressly contemplated herein. Inhibiting the ILR mode for the ILR inhibit time reduces system busyness in the event the stop mode routine restarts quickly after the SS mode exit routine is initiated.

The stop mode routine may end 116 when the vehicle exits the SS mode and the driver is no longer pressing on the brake pedal.

Referring again to determination 106, when SS mode is inhibited (for example, when one or more auto-stop inhibit conditions are satisfied), the controller determines 118 whether an ILR inhibit condition is detected. An ILR inhibit condition may be present, for example, when a transmission fluid temperature is outside of an allowable range. Other instances in which an ILR inhibit condition may be present include when a vehicle is on a grade having a grade value outside of an allowable range, when an ambient temperature is outside of a calibratable range, when a battery temperature is outside of an allowable range, when vehicle climate control is active, when accessory electric current draw exceeds an allowable threshold, when a steering wheel turning angle exceeds an allowable threshold, when a brake pedal pressure is below an allowable threshold, or when a user has deactivated the SS system.

As previously described, upon exiting the SS mode, the controller may initiate an ILR inhibit timer to inhibit activation of the ILR mode for a calibratable ILR inhibit time.

The ILR inhibit timer may be an ILR inhibit condition which may inhibit the ILR mode at determination 108.

Other ILR inhibit conditions are expressly contemplated. Furthermore, auto-stop and ILR inhibit conditions may be based on common vehicle or environmental attributes, but with different thresholds. For example, a first engine temperature may inhibit the SS mode, but not the ILR mode. In this way, the ILR mode may be inhibited once the engine temperature reaches a second engine temperature different than that of the first engine temperature.

If one or more ILR inhibit conditions are detected, the controller may return to block 104 where the controller repeats the stop mode arbitration routine. At block 104, when both the SS mode and the ILR mode are unavailable due to the detection of respective inhibit conditions, the vehicle may operate in a normal idle state.

When the SS mode is inhibited at determination 106 (e.g., due to the detection of one or more auto-stop inhibit conditions), the controller operates the vehicle in an ILR mode at block 120. In one approach, operation of the vehicle in the ILR mode includes operating the transmission in a neutral idle mode. In another approach, operation of the vehicle in the ILR mode includes operating the transmission in a transmission idle load reduction mode.

While operating the vehicle in the ILR mode, the controller determines 122 whether an auto-stop inhibit condition is satisfied. The auto-stop inhibit condition may be the same auto-stop inhibit condition detected at determination 106. For example, the controller may detect at determination 106 that a battery SOC is below a threshold battery SOC, and thus, the controller may inhibit SS mode. In this example, the controller may determine at determination 122 that the battery SOC is above the threshold SOC, and thus, the SS mode is no longer inhibited.

The auto-stop inhibit condition may also or instead be an auto-stop inhibit condition not previously detected at determination 106. For example, the controller may determine that although a previously-present auto-stop inhibit condition is no longer present (e.g., a previously low battery SOC has achieved the threshold battery SOC), a different auto-stop inhibit condition is present (e.g., engine coolant temperature is outside of an allowable range). In this way, the controller continues to monitor for a variety of auto-stop inhibit conditions while operating the transmission in the ILR mode.

When SS mode is not inhibited at determination 122, the controller exits the ILR mode and operates the vehicle in SS mode at block 108. The controller may exit the ILR mode and initiate the SS mode according to a predefined transition profile. For example, the transmission may perform a signed calibratable open loop clutch torque ramp rate that may be calibrated, for example, as positive, neutral, or negative.

In this way, when the vehicle comes to a stop, the controller continues to prioritize the SS mode as the primary stop mode even while operating in the ILR mode.

When SS mode is inhibited at determination 122, the controller monitors 124 for an ILR mode exit condition. An ILR mode exit condition may be, for example, detection of the user releasing the brake pedal from the depressed position, or detection of the user actuating the accelerator. An ILR mode exit condition may also be the detection of one or more ILR inhibit conditions. For example, if the transmission fluid temperature increases or decreases outside of an allowable range, the controller may detect an ILR mode exit condition.

When an ILR mode exit condition is not detected at determination 124, the controller continues to operate the vehicle in ILR mode at block 120. However, when the controller detects an ILR mode exit condition, the controller initiates 126 an ILR mode exit routine.

The stop mode routine may end 116 when the vehicle exits the ILR mode and the driver is no longer pressing on the brake pedal.

In this way, a vehicle may be provided with multiple discrete systems for increasing fuel efficiency (e.g., an auto start-stop system and an idle load reduction system). The vehicle may further be provided with an arbitration routine for selectively activating and deactivating the multiple discrete systems to realize the benefits of the systems while maintaining vehicle performance. In many instances, a first discrete system provides better fuel efficiency and improved emission control as compared to a second discrete system. The vehicle may be controlled such that one discrete system is prioritized over another discrete system.

Although an auto start-stop system is described herein as a prioritized stop mode, it is expressly contemplated that other stop modes may be prioritized over an auto start-stop system. For example, it is expressly contemplated that an idle load reduction system may be prioritized over an auto start-stop system when a vehicle comes to a stop.

While exemplary embodiments are described above, it is not intended that these embodiments describe all possible forms encompassed by the claims. The words used in the specification are words of description rather than limitation, and it is understood that various changes may be made without departing from the spirit and scope of the disclosure. As previously described, the features of various embodiments may be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and may be desirable for particular applications.

What is claimed is:

1. A vehicle comprising:
   an engine operable in an auto stop-start (SS) mode, wherein the engine is configured to auto stop and auto start in the SS mode;
   a transmission operable in an idle load reduction (ILR) mode, wherein engagement of a forward clutch is disposed in an alternate first gear state in the ILR mode; and
   a controller operably connected to the engine and the transmission, wherein the controller is configured to command the engine to operate in the SS mode when a speed of the vehicle is below a predetermined threshold unless one or more SS inhibit conditions are present, and wherein the controller is further configured to, when one or more SS inhibit conditions are present, inhibit operation of the engine in the SS mode and to command the transmission to operate in the ILR mode unless one or more ILR inhibit conditions are present.

2. The vehicle of claim 1, wherein in the alternate first gear state, the forward clutch is disposed in a slipping engagement.

3. The vehicle of claim 1, wherein in the alternate first gear state, the forward clutch is disengaged from a vehicle drivetrain to operate the transmission in a neutral idle mode.

4. The vehicle of claim 1, wherein the controller is further configured to receive a first input indicative of a presence of one or more SS inhibit conditions, and to receive a second input indicative of a presence of one or more ILR inhibit conditions.

5. The vehicle of claim 1, wherein the controller is further configured to inhibit operation of the transmission in the ILR mode when the engine is operating in the SS mode.

6. The vehicle of claim 1, wherein the controller is further configured to inhibit operation of the transmission in the ILR mode for a calibratable inhibit time when the engine exits the SS mode.

7. A vehicle stop mode system comprising:
   a controller programmed to operate an engine in an auto stop-start (SS) mode when a vehicle speed is below a predetermined threshold unless one or more SS inhibit conditions are present, the controller further configured to, when one or more SS inhibit conditions are present, inhibit the SS mode and operate a transmission in an idle load reduction (ILR) mode unless one or more ILR inhibit conditions are present.

8. The vehicle stop mode system of claim 7, wherein the controller is programmed to control engagement of a forward clutch in the ILR mode.

9. The vehicle stop mode system of claim 7, wherein the controller is programmed to inhibit operation of the transmission in the ILR mode while the engine is operating in the SS mode.

10. The vehicle stop mode system of claim 7, wherein the controller is programmed to inhibit operation of the transmission in the ILR mode for a calibratable inhibit time in response to automatically starting the engine.

11. The vehicle stop mode system of claim 7, wherein the controller is programmed to exit the ILR mode and operate the engine in the SS mode unless one or more SS inhibit conditions are present.

12. A method for operating a vehicle when a speed of the vehicle is below a predetermined threshold, comprising:
    operating a vehicle engine in an auto stop-start (SS) mode unless one or more SS inhibit conditions are present; and
    when one or more SS inhibit conditions are present, inhibiting the SS mode and operating a vehicle transmission in an idle load reduction (ILR) mode unless one or more ILR inhibit conditions are present.

13. The method of claim 12, further comprising:
    while operating a vehicle engine in the SS mode, inhibiting operation of the vehicle transmission in the ILR mode.

14. The method of claim 12, further comprising:
    while operating a vehicle engine in the SS mode, automatically starting the vehicle engine in response to a SS mode exit condition.

15. The method of claim 14, further comprising:
    in response to automatically starting the vehicle engine, inhibiting operation of the vehicle transmission in the ILR mode for a calibratable inhibit time.

16. The method of claim 12, wherein operating the vehicle transmission in the ILR mode includes controlling slip at a forward clutch of the vehicle transmission to operate the vehicle transmission in a transmission idle load reduction mode.

17. The method of claim 12, wherein operating the vehicle transmission in the ILR mode includes disengaging a forward clutch of the vehicle transmission to operate the vehicle transmission in a neutral idle mode.

18. The method of claim 12, further comprising:
while operating the vehicle transmission in the ILR mode, detecting for one or more SS inhibit conditions.

19. The method of claim 18, further comprising:
exiting the ILR mode and operating the vehicle engine in the SS mode unless one or more SS inhibit conditions are detected.

20. The method of claim 12, further comprising:
operating the vehicle engine and the vehicle transmission in a normal idle condition when one or more SS inhibit conditions are present and when one or more ILR inhibit conditions are present.

* * * * *